(12) United States Patent
Salvo

(10) Patent No.: US 6,575,754 B2
(45) Date of Patent: Jun. 10, 2003

(54) DEVICE AND METHOD FOR TEACHING MATHEMATICAL PROPERTIES ASSOCIATED WITH EVEN AND ODD NUMBERS

(76) Inventor: Lynnea C. Salvo, 1801 Sheridan Ct., McLean, VA (US) 22101

( * ) Notice: Subject to any disclaimer, the term of this patent is extended or adjusted under 35 U.S.C. 154(b) by 0 days.

(21) Appl. No.: 09/888,412

(22) Filed: Jun. 26, 2001

(65) Prior Publication Data

US 2001/0055746 A1 Dec. 27, 2001

Related U.S. Application Data

(60) Provisional application No. 60/214,250, filed on Jun. 26, 2000.

(51) Int. Cl.$^7$ .............................................. G09B 19/02
(52) U.S. Cl. ........................ 434/195; 434/204; 434/207
(58) Field of Search ................................ 434/191, 194, 434/195, 196, 203, 204, 205, 207

(56) References Cited

U.S. PATENT DOCUMENTS

| | | | | |
|---|---|---|---|---|
| 1,151,279 A | * | 8/1915 | Lewis | 434/195 |
| 2,899,757 A | * | 8/1959 | Webb | 434/195 |
| 2,950,542 A | * | 8/1960 | Steelman | 434/195 |
| 3,002,295 A | * | 10/1961 | Amstrong | 434/195 |
| 3,204,343 A | * | 9/1965 | Pollock | 434/195 |
| 4,518,359 A | * | 5/1985 | Yao-Psong | 434/195 |
| 4,812,123 A | * | 3/1989 | House | 434/195 |
| 5,076,793 A | * | 12/1991 | Aghelvi | 434/196 |
| 5,297,965 A | * | 3/1994 | Manancero | 434/195 |
| 5,421,732 A | * | 6/1995 | Taylor | 434/195 |

OTHER PUBLICATIONS

ETA Cuisenaire, "Rod Tracks", *K–12 Math 2001 Catalog*, p. 74.
ETA Cuisenaire, "Geo Strips Kit", *K–12 Math 2001 Catalog*, p. 113.
J.V. Bruni et al., "Using geostrips for arithmetic", *The Arithmetic Teacher*, Jan. 1975, pp. 4–11.
F.P. Belcastro, "Teaching Addition and Subtraction of Whole Numbers to Blind Students: A Comparison of Two Methods", *Focus on Learning Problems in Mathematics*, Winter Edition, 1993, vol. 15, No. 1, pp. 14–22.

* cited by examiner

*Primary Examiner*—Jacob K. Ackun
*Assistant Examiner*—Kurt Fernstrom
(74) *Attorney, Agent, or Firm*—Jacobson Holman PLLC

(57) ABSTRACT

A concrete manipulative for teaching the properties of odd and even numbers. The manipulative includes an elongated channel having end walls at each end, and a plurality of rods that fit at least partially within the channel. The rods are in two sets of different lengths, with each length being represented by more than one rod. Rods of even length are visually and/or tactilely distinguishable as a set from rods of odd length. The elongated channel displays markings at precise intervals, with the spacing between markings generally being twice the length of the shortest rod. Through a variety of activities involving placement and manipulation of various combinations of the rods within the channel, students are able to identify properties of odd and even numbers. These activities include, but are not limited to, identification of the properties of the lengths of the rods as related to the markings on the channel, addition and multiplication with odd and even rods, the gaining of insight into even and odd multiplication tables, and generalizing from the insights gained to assist in learning multiplication facts.

20 Claims, 2 Drawing Sheets

FIG. 3A  FIG. 3B  FIG. 3C
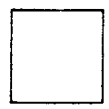 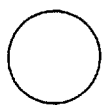 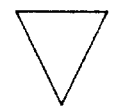
FIG. 4A
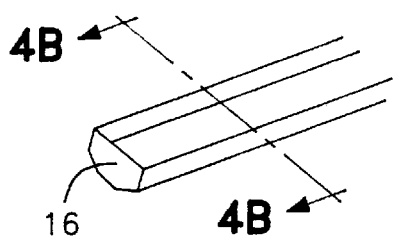
FIG. 4B  FIG. 4C
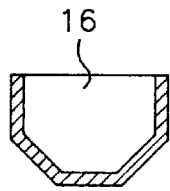 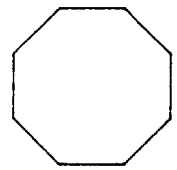
FIG. 5
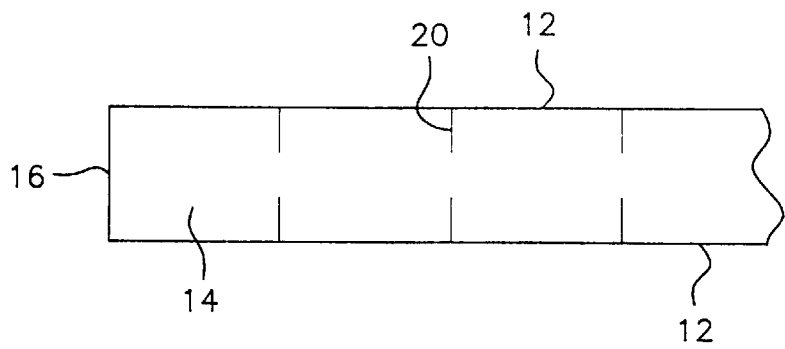

DEVICE AND METHOD FOR TEACHING MATHEMATICAL PROPERTIES ASSOCIATED WITH EVEN AND ODD NUMBERS

This application claims priority from and is entitled to the benefit of prior U.S. provisional application, Ser. No. 60/214,250, filed Jun. 26, 2000.

BACKGROUND OF THE INVENTION

1. Field of the Invention

The present invention is related to the field of mathematics and teaching and, more particularly, to a device for teaching mathematical properties associated with even and odd numbers.

2. Description of the Related Art

Concrete manipulatives have been used in the mathematical field for teaching purposes. For example, Belcastro rods have grooves and dimples that distinguish them from one another and are meant to represent specific numbers. Such rods have been used to assist blind students.

Another example of physical devices used to convey mathematical principles is that of geostrips which are intended for use in constructing geometric figures principally for inquiry into perimeter.

However, a need exists for a concrete manipulative that may be used to highlight the numerical quality of odd and even.

SUMMARY OF THE INVENTION

In view of the foregoing, one object of the present invention is to overcome the difficulties of conveying to students the fundamental characteristics and properties of odd and even numbers.

Another object of the invention is to provide a concrete manipulative that conceals numerical values while highlighting the numerical quality of odd and even.

In accordance with these and other objects, the present invention is directed to a manipulative having an elongated channel and a plurality of rods. The elongated channel has specific markings and an end wall at each end. The rods, which are of different lengths and colors, fit snugly in the channel and, alone and in various combinations, align with or fall midway between respective markings. By manipulating the rods and noting the corresponding markings, the student is able to appreciate specific principles and properties relating to odd and even numbers.

These together with other objects and advantages which will become subsequently apparent reside in the details of the manipulative and its use as more fully hereinafter described and claimed, reference being had to the accompanying drawings forming a part hereof, wherein like numerals refer to like parts throughout.

BRIEF DESCRIPTION OF THE DRAWINGS

FIG. 3A is an end view of one embodiment of a rod from FIG. 2 having a square cross section;

FIG. 3B is an end view of another embodiment of a rod from FIG. 2 having a circular cross section;

FIG. 3C is an end view of yet another embodiment of a rod from FIG. 2 having a triangular cross section;

FIG. 4A is a perspective view of an elongated channel in accordance with an alternative embodiment of the present invention;

FIG. 4B is a cross-sectional view taken along line 4B—4B of the elongated channel of FIG. 4A;

FIG. 4C is an end view of a rod having an octagonal cross section for use with the elongated channel of FIG. 4A; and FIG. 5 is a partial top view of the elongated channel of FIG. 1.

DETAILED DESCRIPTION OF THE PREFERRED EMBODIMENTS

Figure 1:
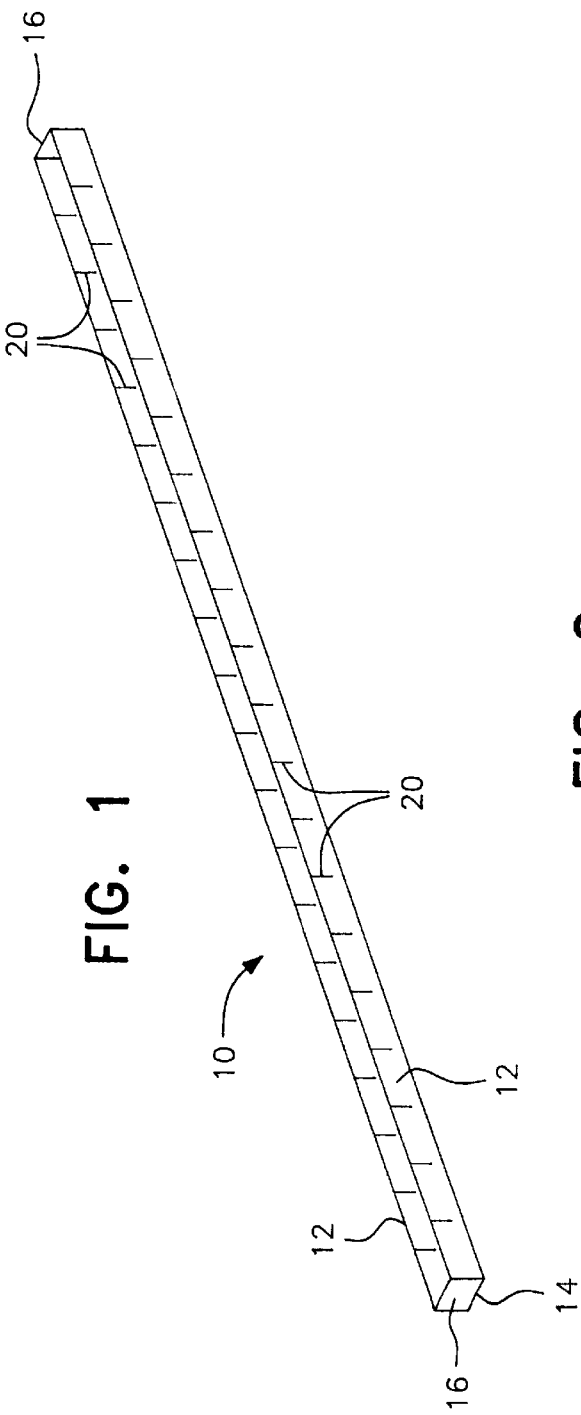
FIG. 1 is a perspective view of a channel in accordance with the present invention.

In describing preferred embodiments of the invention illustrated in the drawings, specific terminology will be resorted to for the sake of clarity. However, the invention is not intended to be limited to the specific terms so selected, and it is to be understood that each specific term includes all technical equivalents which operate in a similar manner to accomplish a similar purpose.

Figure 2:
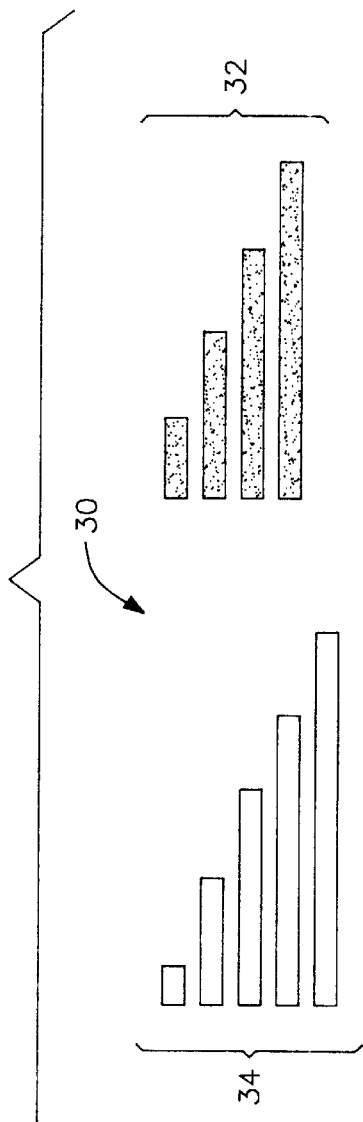
FIG. 2 is a side view of a plurality of rods to be used with the elongated channel of FIG. 1.

As shown in FIGS. 1 and 2, the manipulative of the present invention includes two main parts. The first part is an elongated channel, generally designated by the reference numeral 10. The second part is a plurality of rods, generally designated by the reference numeral 30, as shown in FIG. 2.

As shown in FIG. 1, the elongated channel 10 is straight with two longitudinal sides 12, a bottom 14, and two closed end walls 16. The elongated channel 10 is open on the top, running the full length from one closed end wall 16 to the other closed end wall 16. In a preferred embodiment, the longitudinal sides 12 are substantially parallel to one another while the bottom 14 is substantially perpendicular thereto to define a generally square channel. The elongated channel 10 may also be constructed to have two longitudinal sides joined along an adjacent edge with a third side being open to define a V-shaped channel, or to have three or more side portions to define other cross-sectional shapes.

The length of the channel need not be specific, but is typically at least four times the length of the longest rod. In a preferred embodiment, a length of two to four feet for the channel is generally sufficient for the activities associated with developing the concepts desired to be taught, some of which will be more fully described hereinafter.

The elongated channel 10 may be made of any suitable material, with preferred embodiments including plastic or aluminum, such as commercially available aluminum channel material sold for sliding doors.

On the inside of side walls 12 of the channel 10, and also on the outside of the sides 12, markings 20 are placed prominently and at precise, typically equally-spaced, intervals. The markings may be colored. The distance between markings is preferably equal to twice the length of the shortest rod. Representatively, the marks may be placed at 2" intervals, with the shortest rod thus being 1" in length, but any interval may be used as calculated from the shortest rod.

As shown in FIG. 2, the rods are cut to an assortment of lengths, in a precise ratio related to the markings on the channel 10. The rods 30 are designed to fit snugly into the channel 10 and, preferably, have several rods of each size. Further, according to the preferred embodiment, the rods are constructed to be of two different colors or shades, defining a first set of darker rods 32 and a second set of lighter rods 34. For ease of reference, these colors will be referred to as light and dark, but any color combination allowing for two differentiatable groups or sets of rods may be used.

The rods may be made of any suitable material, with preferred embodiments including plastic and wood, such as wooden dowels. The rods may have any number of shapes, including cross sections that are square, circular, or triangular, as shown in FIGS. 3A, 3B and 3C, respectively. It is preferred to have the shape of the rods complement the cross-sectional shape of the channel, so that if the channel has only two sides, the rods have a triangular cross section, for example. However, any combination of shapes may be used provided the rods fit within the channel to the extent necessary for function as set forth herein. Accordingly, square or circular rods may be used with a two-sided channel, leaving a portion of the rods protruding from the channel, without negating the effective function of the manipulative for its intended purpose.

A further embodiment is shown in FIG. 4A, where the elongated channel has four longitudinal sides and a bottom, forming half of a generally octagonal cross-section shape. A cross sectional view along the line 4B—4B is shown in FIG. 4B, and an end view of a suitably octagon-shaped rod is illustrated in FIG. 4C.

One group of rods, the dark rods 32 for example, are of lengths that are integer multiples of the distance between markings 20. The other group of rods, the light rods 34 in this example, are cut such that when one end is on a marking, the other end is halfway between markings 20. In one representative embodiment, the light rods are of lengths 1", 3", 5", 7" and 9", while the dark rods are of lengths 2", 4", 6", 8" and 10". The use of inches is representative only and not meant to be limiting. More generally, the light rods are of lengths 1x, 3x, 5x, 7x and 9x, while the dark rods are of lengths 2x, 4x, 6x, 8x and 10x, with x being the length of the shortest rod, which can be any desired value. The markings are then spaced every 2x.

The markings 20 may also, or alternatively, be included on the bottom of the channel, as shown in the top view of the elongated channel 10 of FIG. 5.

The manipulative of the present invention may also be constructed for use with visually impaired students. In this case, the two groups of rods are distinguished using tactilely perceptible markings or patterns. For example, the even rods may be constructed with a smooth outer surface while the odd rods may have a grooved or a ribbed outer surface. Alternately, one group of rods could include radial grooves or radial ribs while the other has longitudinal grooves or longitudinal ribs, or one group could have projections or bumps while the other is smooth or indented, etc. Such examples are not intended to be inclusive as any number of tactile differences may be envisioned.

It is further contemplated that each length rod could be constructed with a surface pattern particular to that length so that multiple rods of the same length may more easily be selected from a group of rods. In this embodiment, the markings on the elongated channel are also constructed to be tactilely perceived.

The manipulative may be used to perform a variety of activities. These activities include, but are not limited to, identification of the properties of the lengths of the rods as related to the markings on the channel, addition and multiplication with odd and even rods, the gaining of insight into even and odd multiplication tables, and generalizing from the insights gained to assist in learning multiplication facts.

An exercise relating to identification of the properties of the lengths of the rods as related to the markings on the channel, along with appropriate naming of the rods, serves to establish the properties of the rods as compared to each other and to the channel. Students are instructed to put the dark rods 32 in the channel 10, flush with one of the closed end walls 16, one at a time. They are instructed to notice where the rod pieces end with respect to the markings 20 on the channel 10. Students usually notice quite quickly that each dark rod ends on a mark.

Students are next instructed to put the light rods 34 in the channel 10, again one at a time with the first one flush with an end wall 16. They typically notice quite quickly that the light rods end in between the marks 20 rather than on the marks. Their observations may be summarized as a definition of the rods, namely the rods that are "even" with the marks are even rods, while the rods that end off the mark are odd rods.

An exercise relating to addition begins with the addition of two rods, analogous to the addition of two numbers. The students are asked to add two even rods by placing them end to end, and flush with one end wall, in the channel. The student is then asked to notice whether the sum of the two rods falls on a mark, indicating an even sum, or falls between marks, indicating an odd sum. When two even rods are thus added, the sum ends on a mark and is therefore an even sum.

Next, students add together any odd rod and any even rod. The sum of the rods does not fall on a mark, and thus is an odd sum. Finally, students are instructed to add any two odd rods together. Two odd rods together end on a mark. An even sum resulting from the addition of two odds is almost counterintuitive and students are usually surprised.

Students are preferably asked to summarize the results verbally, such as "Even plus even makes even. Odd plus even makes odd. Two odds make an even." In addition, teachers are instructed to make a chart and to record the results in it for visual verification by the students.

For some students, the information gleaned from addition will be automatically transferred to subtraction. However, for some, particularly small children, the same steps just described may also be carried out as applied to subtraction.

Students can gain additional insights by completely filling the channel with an assortment of rods and keeping the data on the number of odd and even rods that they use to do so. This is the equivalent of adding a collection of numbers. While the number of even rods used may be either odd or even, the number of odd rods will always be even when the channel is filled. This reinforces the concept that a pair of odds "even" each other out.

Multiplication may also be visually demonstrated using the manipulative of the present invention. Because multiplication is the repeated addition of the same number, when using the manipulative of the present invention, multiplication is the repeated use of the same length of rod.

An exercise relating to multiplication begins by instructing students to collect an even number of dark rods, all of which are the same length. As previously noted, dark rods have been designated herein as being even rods. Next, the students assemble their collection of rods end to end in the channel starting at one end wall. The children are instructed to notice where the end of their collection falls, namely even with a mark or off a mark. Of course, if they have done this correctly, the rods will end on a mark as the product will be on a mark.

To illustrate even times odd, the students are instructed to gather an even number of light rods, all of the same length. As already noted, light rods have been designated herein as being odd rods. The students are generally interested to note that an even number of odd rods also falls on a mark.

To illustrate odd times even, a different manipulation is required because the students must gather an odd number of dark (even) rods 32, all of the same length. However, the result is the same as it is for the even times odd scenario.

To illustrate odd times odd, the students are instructed to gather an odd number of equal-length light (odd) rods 34, and to assemble them in the channel. This time the product is off the mark, which often surprises the students.

As before, teachers and students are encouraged to summarize their results verbally and visually.

The present invention also enables students to gain insight into even and odd multiplication tables which have distinct odd and even characteristics that can be presented visually through use of the manipulative according to the present invention.

To illustrate characteristics of even multiplication tables, the students collect a set of dark (even) rods 32, all of the same length. As they place the rods into the channel 10 one at a time, they notice whether the interim "product" is even with or off the marking 20. For even tables, all products, as represented by the ends of the rod collections, are even with the marks, illustrating to the students that all the multiplication facts on even tables have even answers.

To illustrate characteristics of odd multiplication tables, the students collect a set of light (odd) rods 34, all of the same length. As with the even rods 32, they place the rods into the channel 10 one at a time, noticing whether the interim "product" is even with or off the marking 20. For odd tables, the products, as represented by the ends of the rod collections, alternate between being off the marks and even with the marks, illustrating to the students that the products on odd multiplication tables alternate back and forth from odd to even.

Having provided the students with some insight, the manipulative according to the present invention may also be used to help students to understand and learn the multiplication tables. Children who are just beginning to learn their multiplication facts may be asked to generalize about the task before them with a written exercise requiring that they observe the answers to the multiplication facts and identify each as either odd or even. They will discover that far more of the facts from 1×1 to 10×10 have even answers, in fact, 75% of them have even answers. Students can predict the quality of the answers to their multiplication facts before actually trying to compute or remember the exact answer, i.e., they will guide their own answer by identifying first the type of number, odd or even, that they should get. More advanced students may use a written activity sheet in which they have to fill in the answers to the multiplication facts themselves, recalling the answers to the facts first and recognizing them as odd or even afterwards. Students may also be asked to highlight the answers that must be odd first, before they fill in the answers.

The manipulative of the present invention may also be used to create "attribute trains" whereby children make up patterns such as odd-even-odd, repeat them several times, and observe the interim and final results as related to odd or even.

A further application of the present invention relates to algebra and the fact that 2x is always an even value. To show this principle with the channel and rods, the length of the shortest rod may be considered to represent a fundamental integer x, with all of the rods then being integer lengths that are multiples of x. If any two identical rods are placed end to end in the channel against one end wall, the "free" end will always be even with a mark, which has previously been established to represent "even-ness". Thus, 2x is visually shown to be even. If half the distance between the markings is taken to be the fundamental integer 1, then the fact that 2x+1 is always odd may be demonstrated with the manipulative according to the present invention.

The concept and purpose of the present invention may also be embodied through a virtual manipulative, i.e., a computer-based or software version of the physical manipulative. By selecting and placing (clicking, dragging, etc.) graphic images of the rods into a virtual channel using a standard keyboard, mouse or other suitable input device, students may be visually presented with the same results attained using the physical manipulative. The software may further be implemented as an interactive tutorial which takes the students through a teaching sequence or through one or several of a plurality of teaching units which the student may select from an on-screen menu, or other means, as would be known by persons of skill in the art. The students may further be requested to "verbalize" their observations through response to on-screen prompts, auditory cues, etc., to which the software has been programmed to respond appropriately.

The foregoing descriptions and drawings should be considered as illustrative only of the principles of the invention. The invention may be configured in a variety of shapes and sizes and is not limited by the dimensions of the preferred embodiments. Further, numerous applications of the present invention will readily occur to those skilled in the art. Therefore, it is not desired to limit the invention to the specific examples disclosed or the exact construction and operation shown and described. Rather, all suitable modifications and equivalents may be resorted to, falling within the scope of the invention.

What is claimed is:

1. A device for teaching mathematical properties associated with even and odd numbers, comprising:
    an elongated channel having a plurality of longitudinal sides and end walls at each end, said elongated channel having markings placed thereon at equally spaced intervals; and
    a plurality of rods, each rod sized to fit at least partially within said channel, said plurality of rods being divided into two sets and including rods of different lengths, a first set having rods of only even lengths as defined with relation to said markings and a second set having rods of only odd lengths as defined with relation to said markings, a distance between markings being equal to twice a length of a shortest rod.

2. The device as set forth in claim 1, said first set of rods having a visually distinctive characteristic distinguishing said first set from said second set.

3. The device as set forth in claim 2, wherein said first set is a first color and said second set is a second color visually distinguishable from said first color.

4. The device as set forth in claim 1, wherein the markings are placed on an inner surface of said channel.

5. The device as set forth in claim 1, wherein the markings are placed on an outer surface of at least one longitudinal side.

6. The device as set forth in claim 5, wherein the markings are further placed on an inner surface of said channel.

7. The device as set forth in claim 6, wherein the markings are in color.

8. The device as set forth in claim 1, wherein the markings are spaced so that when a number of rods from said first set are placed end to end beginning against one of said end walls, an end of said number of rods not against the end wall aligns with a respective marking.

9. The device as set forth in claim 8, wherein rods in said first set include rods having lengths of 2x, 4x, 6x and 8x, and said markings are placed at 2x intervals, with x being a length of a shortest rod.

10. The device as set forth in claim 1, wherein the markings are spaced so that when an uneven number of rods from said second set are placed end to end beginning against one of said end walls, an end of said uneven number of rods not against said end wall lies midway between two markings.

11. The device as set forth in claim 10, wherein rods in said second set include rods having lengths of 1x, 3x, 5x and 7x, and said markings are placed at 2x intervals, with x being a length of a shortest rod.

12. The device as set forth in claim 1, wherein the markings are spaced so that when a number of rods from said first set are placed end to end beginning against one of said end walls, an end of said number of rods not against the end wall aligns with a respective marking while when an uneven number of rods from said second set are placed end to end beginning against one of said end walls, an end of said uneven number of rods not against the end wall lies midway between two markings.

13. A device for teaching mathematical properties associated with even and odd numbers, comprising:
    an elongated channel having end walls at each end and markings equally spaced therealong; and
    a plurality of rods, each rod sized to fit at least partially within said channel, said plurality of rods being divided into two sets and including rods of different lengths, a first set having rods of only even lengths and a second set having rods of only odd lengths, with even lengths and odd lengths defined in relation to said markings, a distance between markings being equal to twice a length of a shortest rod so that when an uneven number of rods from said second set are placed end to end beginning against one of said end walls, an end of said uneven number of rods not against the end wall does not align with any of said markings but lies midway between two markings.

14. The device as set forth in claim 13, wherein said first set of rods has a distinctive characteristic relative to said second set of rods.

15. The device as set forth in claim 14, wherein said distinctive characteristic is visually perceived.

16. The device as set forth in claim 14, wherein said distinctive characteristic is tactilely perceived.

17. The device as set forth in claim 16, wherein each length of rod is associated with a particular surface characteristic.

18. The device as set forth in claim 13, wherein rods in said first set include rods having lengths of 2x, 4x, 6x and 8x, rods in said second set include rods having lengths of 1x, 3x, 5x and 7x, and said markings are placed at 2x intervals, with x being a length of a shortest rod.

19. A device for teaching mathematical properties associated with even and odd numbers, comprising:
    an elongated channel having a plurality of longitudinal sides and end walls at each end, said elongated channel having markings placed thereon at equally spaced intervals; and
    a plurality of rods of different lengths divided into first and second sets with a shortest rod having length x, each rod sized to fit at least partially within said channel, lengths of rods in said first set being even multiples of x and lengths of rods in said second set being odd multiples of x, each of said equally spaced marking intervals being an even multiple of x.

20. The device as set forth in claim 19, wherein rods in said first set include rods having lengths of 2x, 4x, 6x and 8x, rods in said second set include rods having lengths of 1x, 3x, 5x and 7x, and said markings are placed at 2x intervals.

* * * * *